United States Patent
Mou et al.

(10) Patent No.: US 10,218,829 B2
(45) Date of Patent: *Feb. 26, 2019

(54) PORTABLE ELECTRONIC DEVICE

(71) Applicant: Microjet Technology Co., Ltd., Hsinchu (TW)

(72) Inventors: Hao-Jan Mou, Hsinchu (TW); Ta-Wei Hsueh, Hsinchu (TW); Shih-Chang Chen, Hsinchu (TW); Jia-Yu Liao, Hsinchu (TW); Wei-Ming Lee, Hsinchu (TW); Yung-Lung Han, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,071

(22) Filed: Mar. 20, 2018

(65) Prior Publication Data
US 2018/0278733 A1  Sep. 27, 2018

(30) Foreign Application Priority Data
Mar. 21, 2017  (TW) .............................. 106109370 A

(51) Int. Cl.
*G06F 1/16* (2006.01)
*H04M 1/02* (2006.01)
(Continued)

(52) U.S. Cl.
CPC ......... *H04M 1/0268* (2013.01); *F15B 11/064* (2013.01); *F15B 15/10* (2013.01);
(Continued)

(58) Field of Classification Search
CPC ..... H04M 1/0268; F15B 15/10; F15B 11/064; F15B 2211/20515; G06F 1/1656; G06F 1/1626

See application file for complete search history.

(56) References Cited

U.S. PATENT DOCUMENTS 6,144,550 A * 11/2000 Weber .................. G06F 1/1613
  345/903
6,726,106 B1 * 4/2004 Han ...................... G06F 1/1626
  235/472.01

(Continued)

FOREIGN PATENT DOCUMENTS

TW  200905578 A  2/2002
TW  I310573 B  6/2009
TW  M439209 U1  10/2012

*Primary Examiner* — Lewis G West
(74) *Attorney, Agent, or Firm* — Birch, Stewart, Kolasch & Birch, LLP

(57) ABSTRACT

A portable electronic device includes a casing, a flexible display panel, a cushion, an inflatable pad, a gas transportation device and a sensing unit. The flexible display panel is embedded in the casing and including a movable region. The cushion is attached on a bottom surface of the movable region. The inflatable pad is attached on a bottom surface of the flexible display panel and covers the cushion. The gas transportation device is in communication with the inflatable pad and electrically connected with the sensing unit. When the sensing unit is touched by a user, a first driving signal is transmitted from the sensing unit to the gas transportation device, in response to which the gas transportation device inflates the inflatable pad again to raise the cushion, so that the movable region corresponding to the cushion is raised.

11 Claims, 15 Drawing Sheets

(51) Int. Cl.
*F15B 15/10* (2006.01)
*F15B 11/064* (2006.01)

(52) U.S. Cl.
CPC .......... *G06F 1/1626* (2013.01); *G06F 1/1656* (2013.01); *F15B 2211/20515* (2013.01)

(56) References Cited

U.S. PATENT DOCUMENTS

| | | | |
|---|---|---|---|
| 8,929,085 B2 * | 1/2015 | Franklin | G06F 1/1626 361/749 |
| 9,307,061 B2 * | 4/2016 | Nikula | G06F 1/1626 |
| 2006/0038745 A1 * | 2/2006 | Naksen | G06F 1/1624 345/30 |
| 2015/0103018 A1 * | 4/2015 | Kamin-Lyndgaard | G09G 5/006 345/173 |
| 2015/0195926 A1 * | 7/2015 | Kandur Raja | G06F 1/1605 348/373 |
| 2018/0068594 A1 * | 3/2018 | Dong | H05K 1/028 |
| 2018/0228036 A1 * | 8/2018 | Mou | H05K 5/0017 |

* cited by examiner

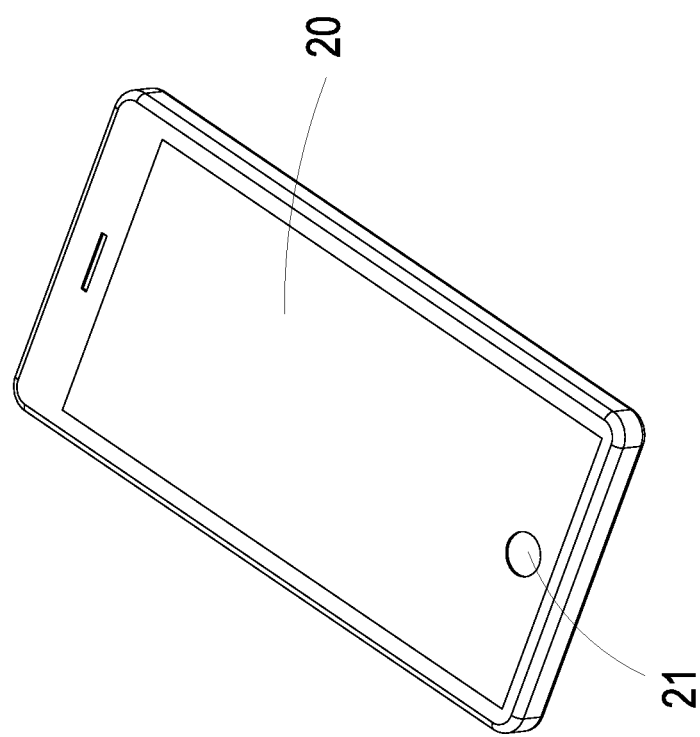

PORTABLE ELECTRONIC DEVICE

FIELD OF THE INVENTION

The present invention relates to a portable electronic device, and more particularly to a portable electronic device with an inflatable pad for supporting a display panel and being further inflated to raise a particular part of the display panel.

BACKGROUND OF THE INVENTION

Generally, portable electronic devices such as smart phones or tablet computers are widely used. As known, the physical key of the portable electronic device results in some drawbacks. For example, in case that the smart phone is equipped with the physical key, the physical key increases the size and weight of the smart phone. Moreover, the life span of the physical key is short, and the aesthetically-pleasing appearance is adversely affected. Nowadays, some portable electronic devices are equipped with virtual keys. However, the tactile feel provided by the virtual key is not comparable to the tactile feel of the physical key. Therefore, the benefits of the virtual key and the physical key should be taken into consideration.

SUMMARY OF THE INVENTION

The present invention provides a portable electronic device having the functions of the visual key and the physical key. The display panel of the portable electronic device can provide a flat displaying surface. In case that the tactile feel of depressing physical key is required, a portion of the display panel is raised to be used as the physical key. Since the portable electronic device of the present invention is not equipped with the physic key, the fabricating cost and the weight of the portable electronic device are reduced and the life span is prolonged. Moreover, the integrity is enhanced, and the visual effect is improved.

In accordance with an aspect of the present invention, a portable electronic device is provided. The portable electronic device includes a casing, a flexible display panel, a cushion, an inflatable pad, a gas transportation device and a sensing unit. The flexible display panel is coupled with the casing and includes a movable region. The cushion is attached on a bottom surface of the flexible display panel and corresponding to the movable region of the flexible display panel. The inflatable pad is also attached on the bottom surface of the flexible display panel while covering the cushion. The gas transportation device is disposed within the casing and in communication with the inflatable pad. When a gas is transmitted from the gas transportation device to the inflatable pad, the inflatable pad is inflated with the gas so as to support the flexible display panel. The sensing unit is electrically connected with the gas transportation device. When an external contact force is sensed by the sensing unit, a first driving signal is transmitted from the sensing unit to the gas transportation device. In response to the first driving signal, the gas transportation device transfers gas to the inflatable pad again to further expand the inflatable pad, so that the inflatable pad raises the cushion to make the movable region of the flexible display panel which corresponds to the cushion raised.

In accordance with another aspect of the present invention, a portable electronic device is provided. The portable electronic device includes a casing, a display panel, a cushion, an inflatable pad, a gas transportation device and a sensing unit. The display panel is coupled with the casing. The display panel includes a pliable display region. The cushion is attached on a bottom surface of the display panel and corresponding to the pliable display region of the display panel. The inflatable pad is also attached on the bottom surface of the display panel and covering the cushion. The gas transportation device is disposed within the casing and in communication with the inflatable pad. When a gas is transmitted from the gas transportation device to the inflatable pad, the inflatable pad is inflated with the gas so as to support the display panel. The sensing unit is electrically connected with the gas transportation device. When an external contact force is sensed by the sensing unit, a first driving signal is transmitted from the sensing unit to the gas transportation device. In response to the first driving signal, the gas transportation device transfers gas to the inflatable pad again to further expand the inflatable pad, so that the inflatable pad raises the cushion to make the pliable display region of the display panel corresponding to the cushion raised.

The above contents of the present invention will become more readily apparent to those ordinarily skilled in the art after reviewing the following detailed description and accompanying drawings, in which:

BRIEF DESCRIPTION OF THE DRAWINGS

FIG. 1A is a schematic perspective view illustrating the appearance of a portable electronic device according to a first embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
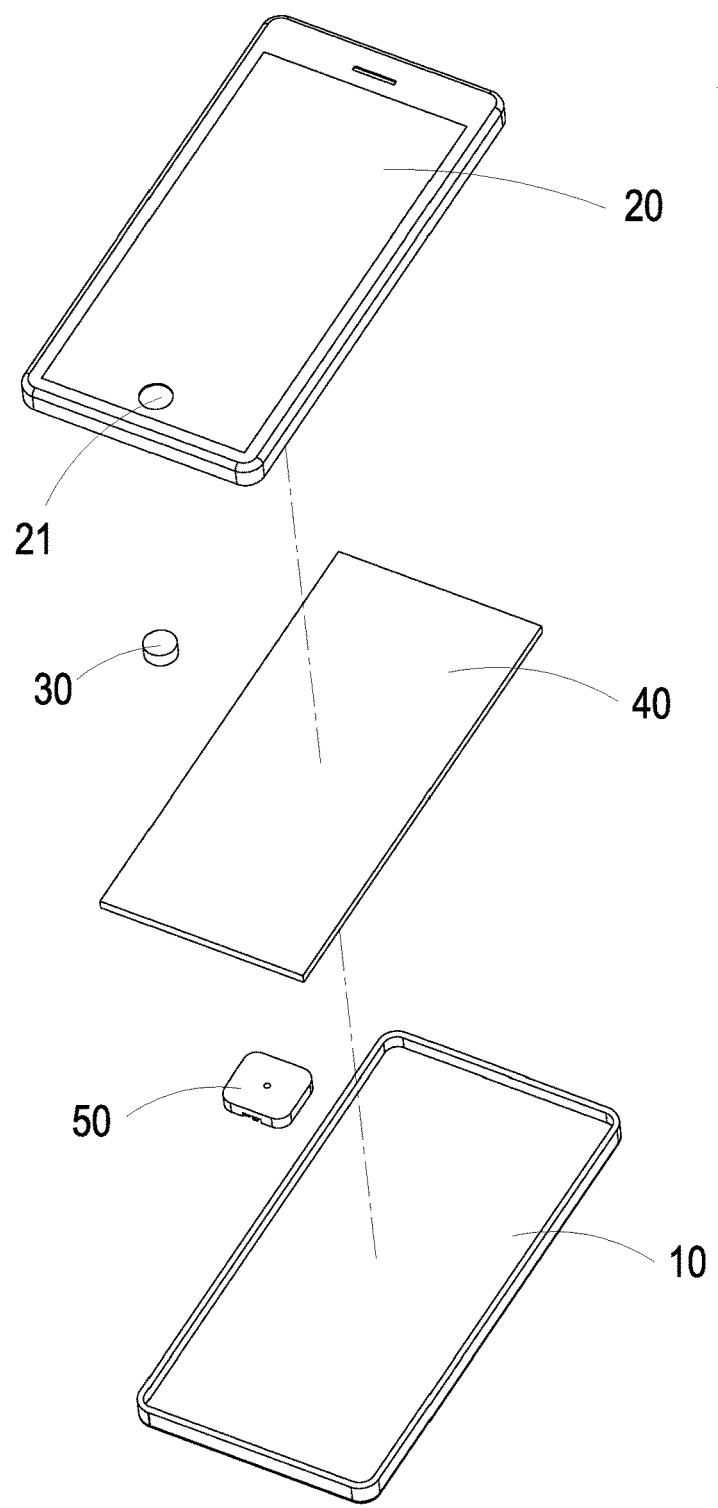
FIG. 1B is a schematic exploded view illustrating the portable electronic device of FIG. 1A.

Please refer to FIGS. 1A and 1B. FIG. 1A is a schematic perspective view illustrating the appearance of a portable electronic device according to a first embodiment of the present invention. FIG. 1B is a schematic exploded view illustrating the portable electronic device of FIG. 1A. The portable electronic device 1 comprises a casing 10, a flexible display panel 20, a cushion 30, an inflatable pad 40 and a gas transportation device 50. The flexible display panel 20 is embedded in the casing 10. Moreover, the flexible display panel 20 comprises a movable region 21 that is vertically movable.

Figure 2:
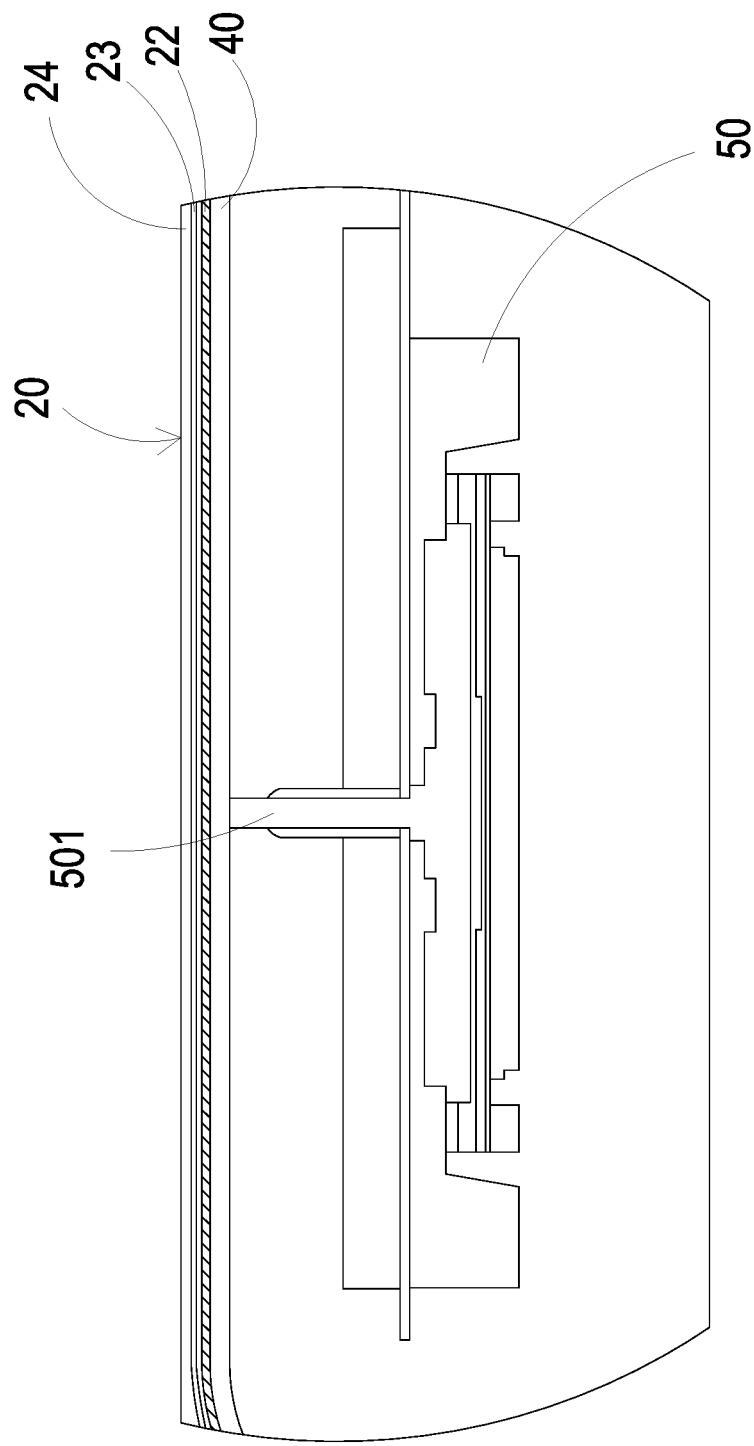
FIG. 2 is a schematic partial cross-sectional view illustrating the portable electronic device of FIG. 1A.

Please refer to FIGS. 1B and 2. FIG. 2 is a schematic partial cross-sectional view illustrating the portable electronic device of FIG. 1A. The cushion 30 is attached on a bottom surface of the movable region 21. The inflatable pad 40 is attached on a bottom surface of the flexible display panel 20 and covering the cushion 30. The gas transportation device 50 is disposed within the casing 10. Moreover, the gas transportation device 50 is in communication with the inflatable pad 40 through a communication pipe 501. In some embodiments, the gas transportation device 50 further comprises a control unit (not shown). The control unit is used for receiving information from the user and driving the operation of the gas transportation device 50.

The portable electronic device 1 further comprises a sensing unit (not shown) electrically connected with the gas transportation device 50 and disposed upon the casing 10 or upon the movable region 21. When the user's finger presses the movable region 21, the sensing unit senses the external contact force from the user's finger and issues a first driving signal to the gas transportation device 50.

Figure 3A:
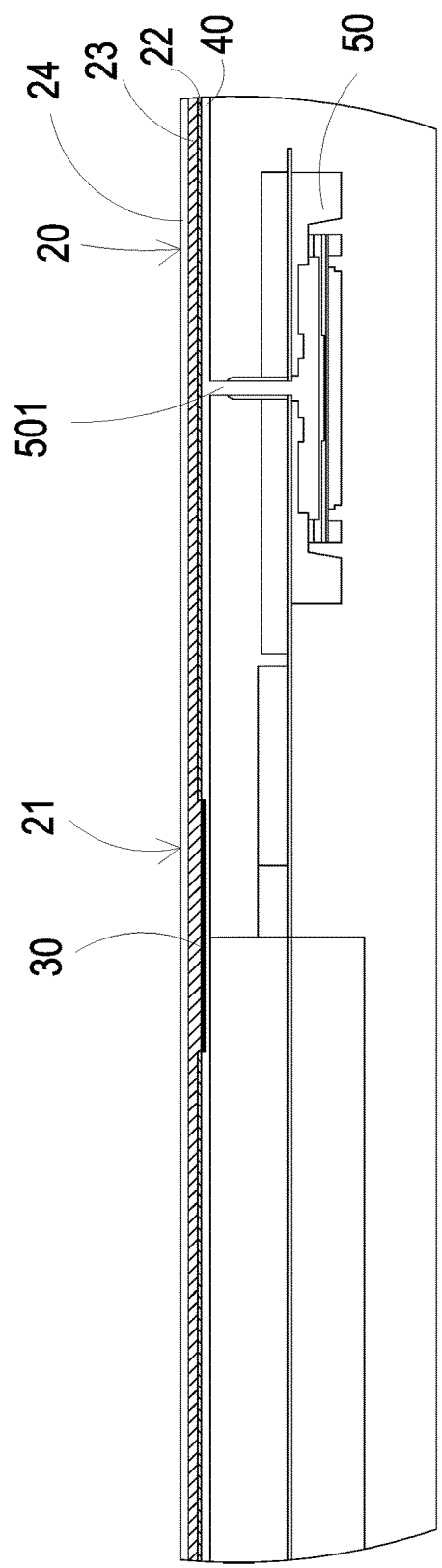
FIG. 3A is a schematic partial cross-sectional view illustrating the portable electronic device of FIG. 1A.

Please refer to FIG. 3A. FIG. 3A is a schematic partial cross-sectional view illustrating the portable electronic device of FIG. 1A. For keeping the flexible display panel 20 in a flat state, the gas transportation device 50 transfers gas to the gas inflatable pad 40 so that the gas inflatable pad 40 is inflated and provides a supporting force to the flexible display panel 20. Consequently, as shown in FIG. 3A, the flexible display panel 20 is maintained flat and available.

Figure 3B:
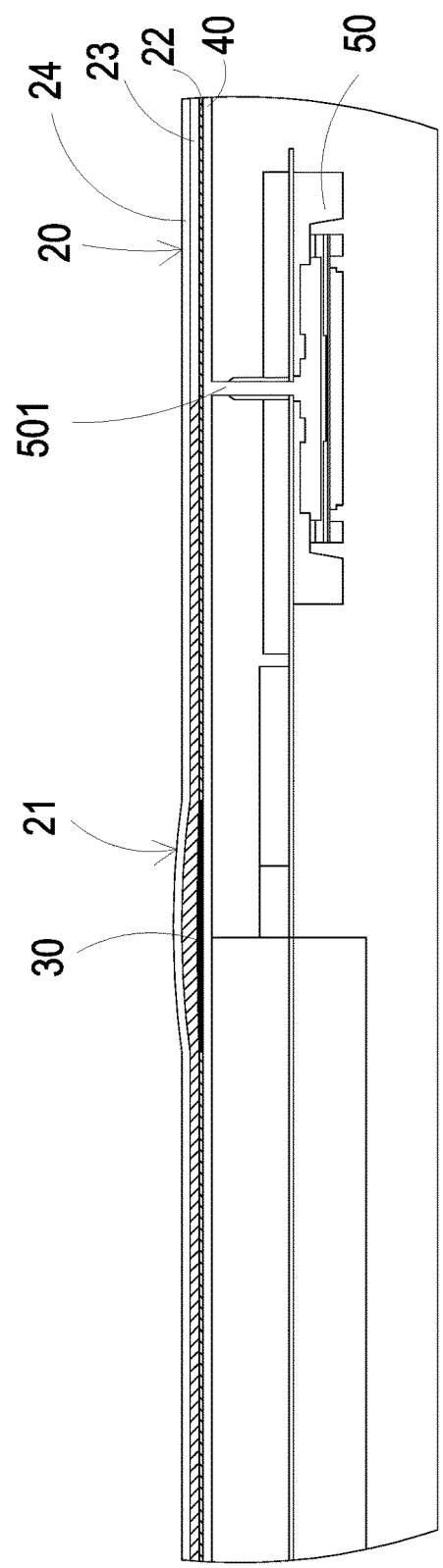
FIG. 3B is a schematic partial cross-sectional view illustrating the portable electronic device of FIG. 1A, in which the inflatable pad in the movable region is raised.

Please refer to FIG. 3B. FIG. 3B is a schematic partial cross-sectional view illustrating the portable electronic device of FIG. 1A, in which the movable region 21 of the flexible display panel 20 has been raised. When the sensing unit senses a touch, the sensing unit issues a first driving signal to the gas transportation device 50. In response to the first driving signal, the gas transportation device 50 transfers gas to the inflatable pad 40 again. Since the portion of the inflatable pad 40 under the cushion 30 is inflated with the gas and further expanded, the cushion 30 is raised. As the cushion 30 is raised, the movable region 21 of the flexible display panel 20 on the cushion 30 is raised thereby. Under this circumstance, the raised movable region 21 is formed as a key to be pressed by the user. In other words, by inflating the inflatable pad 40, the cushion 30 and the movable region 21 are raised to imitate a physical key, which means the tactile feel of depressing the movable region 21 is similar to the tactile feel of depressing the physical key. As so, the cost and space of installing the physical key are reduced.

Please refer to FIG. 2 again. The flexible display panel 20 further comprises a sensing layer 22 and a displaying layer 23. The displaying layer 23 is stacked on a top side of the sensing layer 22, whereas the inflatable pad 40 is attached on a bottom side of the sensing layer 22. An example of the displaying layer 23 includes but is not limited to a plasma display plate, a liquid crystal display plate or an organic light emitting diode (OLED) display plate. The sensing layer 22 may be a capacitive sensing layer or a resistance sensing layer for sensing the pressure applied thereto and generates a corresponding feedback signal according to the pressure. In some embodiments, the flexible display panel 20 further comprises a covering layer 24. The covering layer 24 is located over the displaying layer 23, being the topmost layer of the flexible display panel 20 for protecting the displaying layer 23 and the sensing layer 22. For example, the covering layer 24 is a light-transmissible plastic plate, a light-transmissible acrylic plate or a light-transmissible glass plate.

Figure 4B:
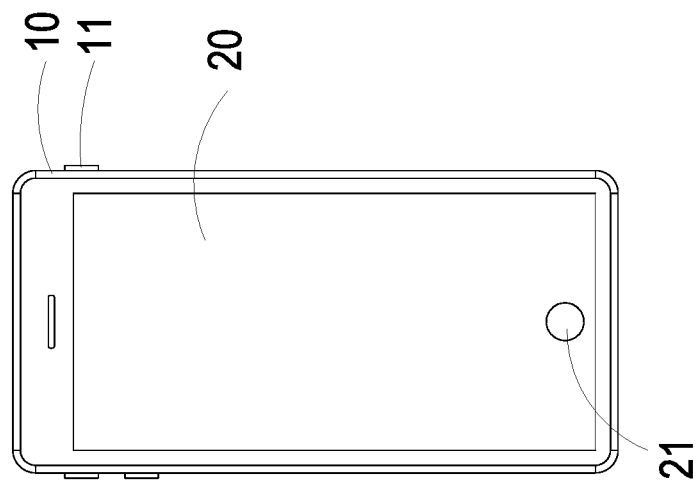
FIG. 4B is a schematic front view illustrating the portable electronic device of FIG. 4A, in which at least one key is raised from at least one lateral side of the portable electronic device.
Figure 4A:
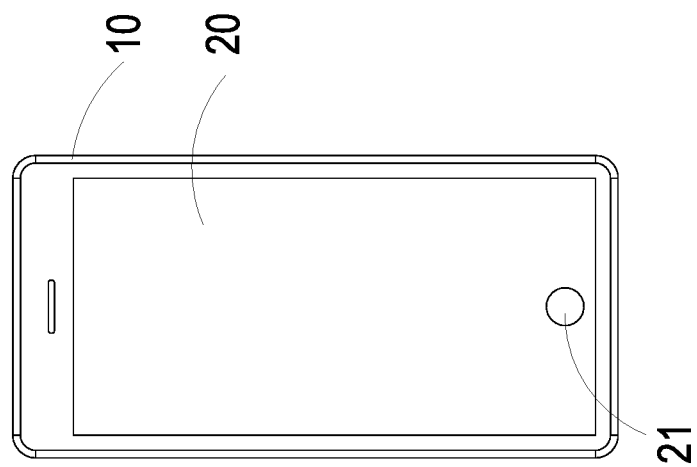
FIG. 4A is a schematic front view illustrating the portable electronic device of FIG. 1A.

Please refer to FIGS. 4A and 4B. FIG. 4A is a schematic front view illustrating the portable electronic device of FIG. 1A. FIG. 4B is a schematic front view illustrating the portable electronic device of FIG. 4A, in which at least one key is raised from at least one lateral side of the portable electronic device. As shown in FIGS. 4A and 4B, at least one key 11 is embedded in at least one lateral side of the portable electronic device. A gas bag (not shown) is located under the key 11, being in communication with the gas transportation device 50 through an additional communication pipe. As shown in FIG. 4A, the at least one key 11 in an unavailable state is at the same level with the corresponding lateral side of the casing 10. As shown in FIG. 4B, when the sensing unit senses a touch from user, the sensing unit issues a second driving signal to the gas transportation device 50. In response to the second driving signal, the gas transportation device 50 transfers gas to the gas bag. Since the gas bag is inflated with the gas and expanded, the at least one key 11 is raised and protruding from the corresponding lateral side of the casing 10. The at least one key 11 may be a power key or a sound volume key, in which the number, function and position of the at least one key 11 may be varied according to the practical requirements.

Figure 5A:
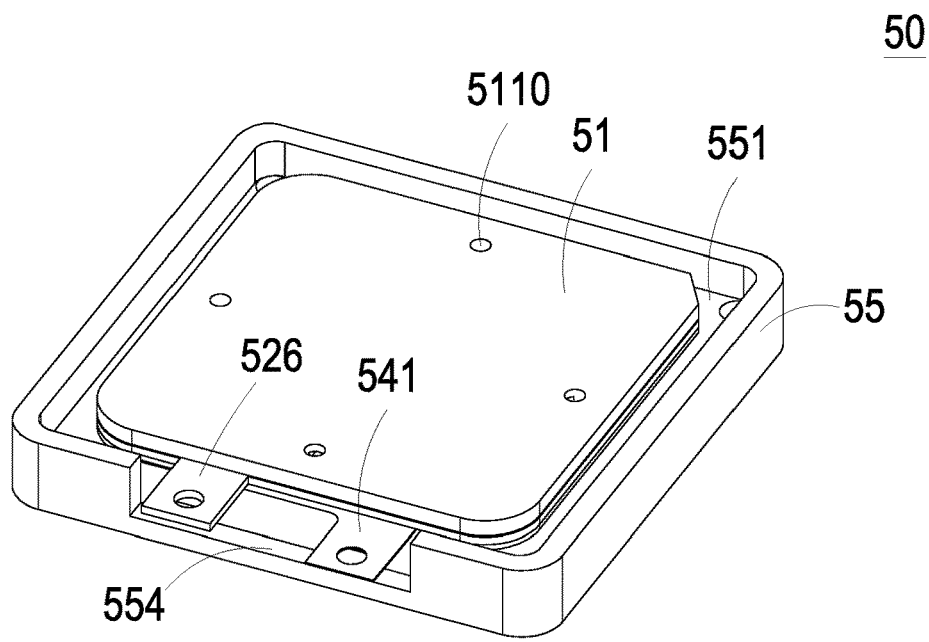
FIG. 5A is a schematic perspective view illustrating the gas transportation device of the portable electronic device of FIG. 1 and taken along the front side.
Figure 5B:
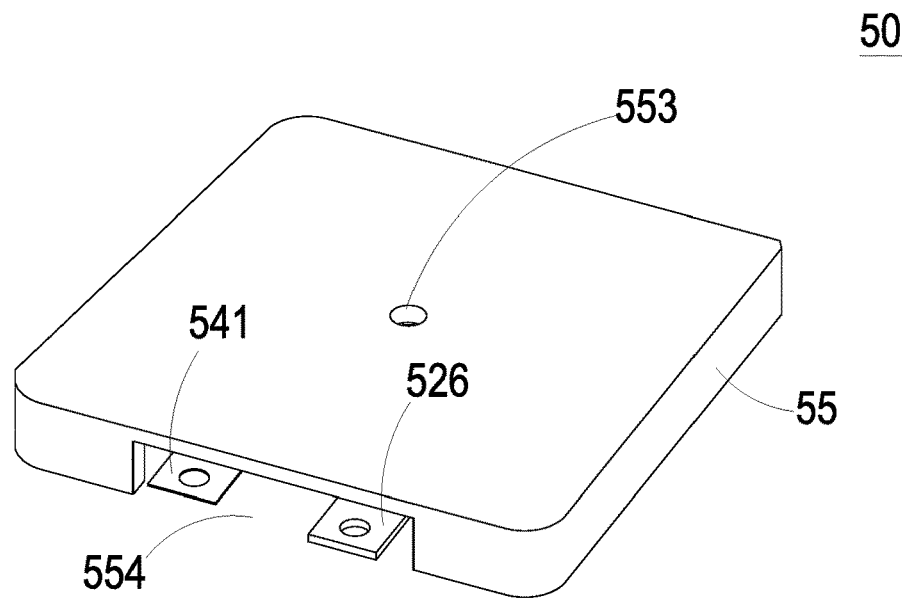
FIG. 5B is a schematic perspective view illustrating the gas transportation device of the portable electronic device of FIG. 1 and taken along the rear side.
Figure 6A:
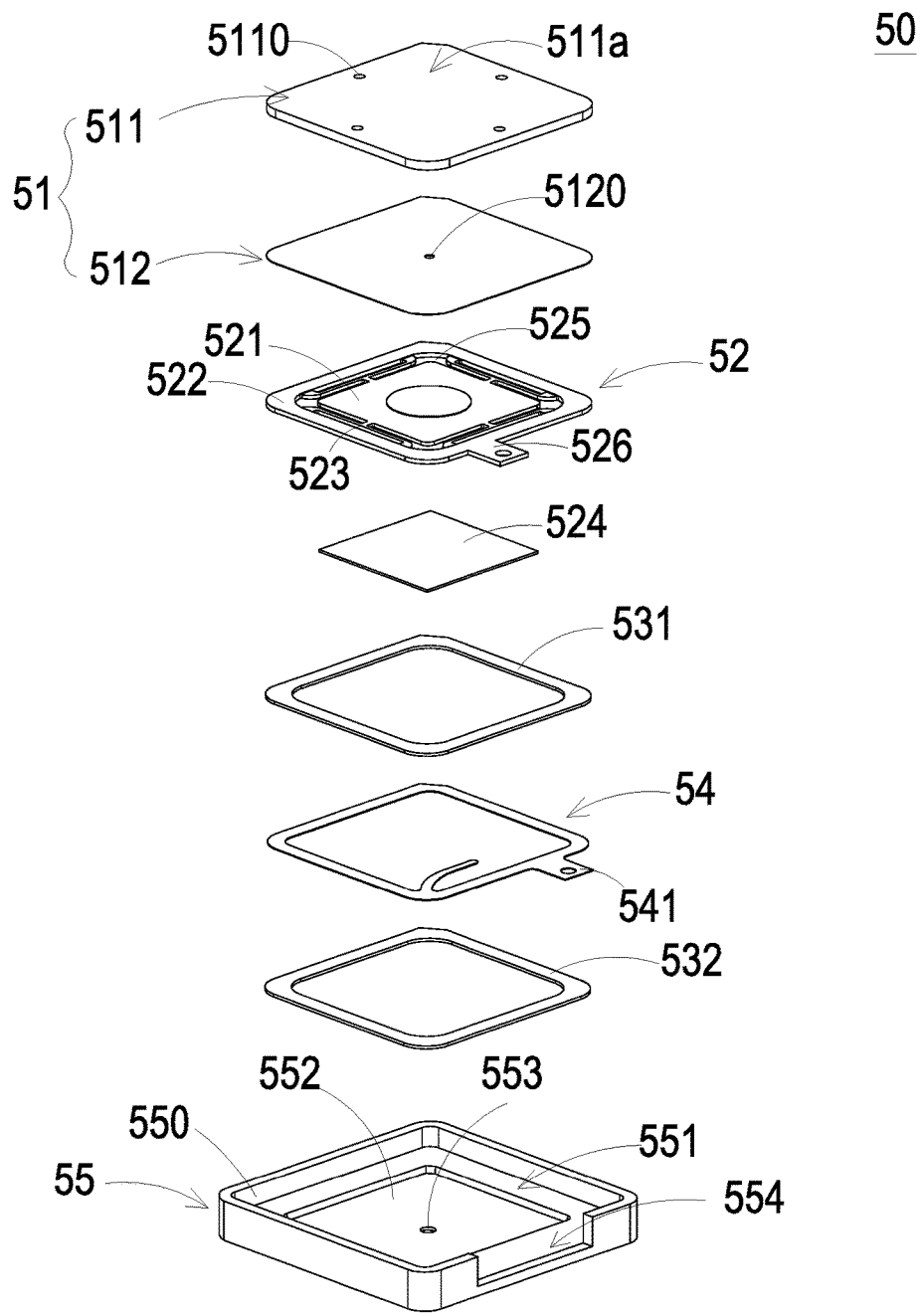
FIG. 6A is a schematic exploded view illustrating the gas transportation device of the portable electronic device of FIG. 1 and taken along the front side.
Figure 6B:
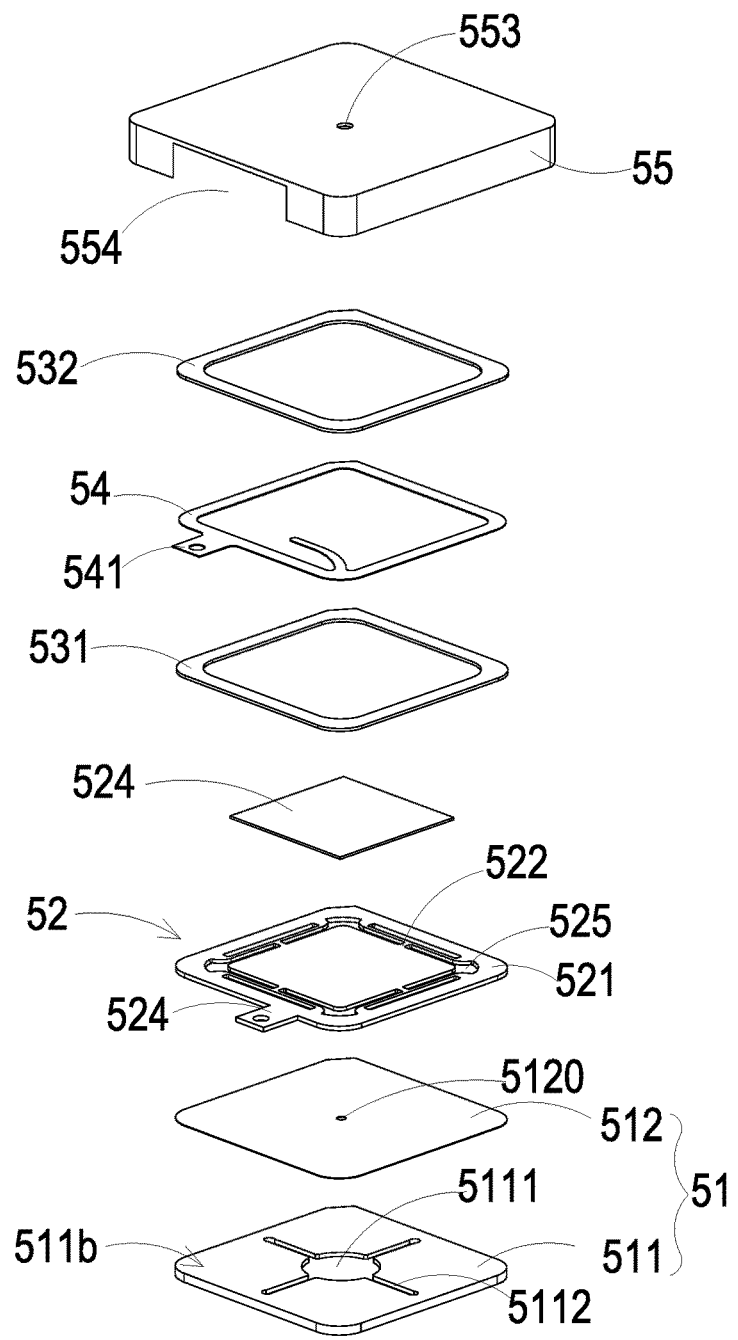
FIG. 6B is a schematic exploded view illustrating the gas transportation device of the portable electronic device of FIG. 1 and taken along the rear side.
Figure 7:
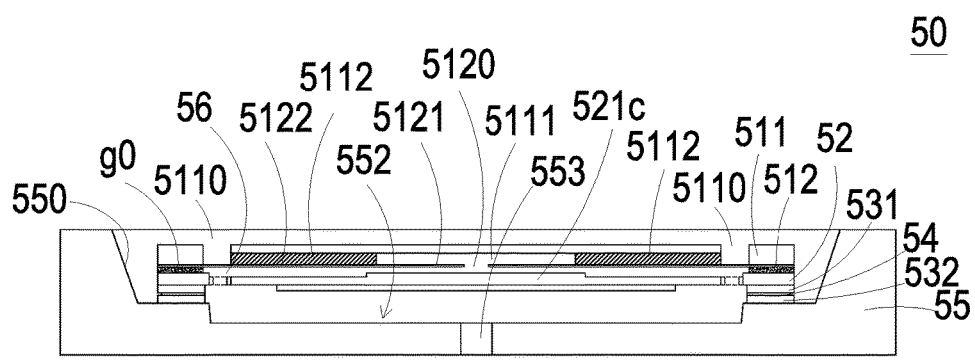
FIG. 7 is a schematic cross-sectional view illustrating the gas transportation device of the portable electronic device of FIG. 1.

Please refer to FIGS. 5A, 5B, 6A, 6B and 7. FIG. 5A is a schematic perspective view illustrating the gas transportation device of the portable electronic device of FIG. 1 and taken along the front side. FIG. 5B is a schematic perspective view illustrating the gas transportation device of the portable electronic device of FIG. 1 and taken along the rear side. FIG. 6A is a schematic exploded view illustrating the gas transportation device of the portable electronic device of FIG. 1 and taken along the front side. FIG. 6B is a schematic exploded view illustrating the gas transportation device of the portable electronic device of FIG. 1 and taken along the rear side. FIG. 7 is a schematic cross-sectional view illustrating the gas transportation device of the portable electronic device of FIG. 1.

As shown in the drawings, the gas transportation device 50 comprises a base 51, a piezoelectric actuator 52, a first insulation plate 531, a conducting plate 54, a second insulation plate 532 and a gas collecting plate 55. The base 51 comprises a gas inlet plate 511 and a resonance plate 512. The piezoelectric actuator 52 is aligned with the resonance plate 512. The gas inlet plate 511, the resonance plate 512, the piezoelectric actuator 52, the first insulation plate 531, the conducting plate 54, the second insulation plate 532 and the gas collecting plate 55 are stacked on each other sequentially. Moreover, the piezoelectric actuator 52 comprises a suspension plate 521, an outer frame 522, at least one bracket 523 and a piezoelectric plate 524.

The gas inlet plate 511 comprises a second surface 511a, a first surface 511b and the at least one inlet 5110. In this embodiment, the gas inlet plate 511 comprises four inlets 5110. The inlets 5110 run through the second surface 511a and the first surface 511b of the gas inlet plate 511. In response to the action of the atmospheric pressure, the gas can be introduced into the gas transportation device 50 through the at least one inlet 5110.

As shown in FIGS. 6A and 6B, at least one convergence channel 5112 is formed in the first surface 511b of the gas inlet plate 511, and is in communication with the at least one inlet 5110 in the second surface 511a of the gas inlet plate 511. Moreover, a central cavity 5111 is formed in the first surface 511b of the gas inlet plate 511 and located at the intersection of the convergence channels 5112. The central cavity 5111 is in communication with the at least one convergence channel 5112, such that the gas entered by the inlet 5110 would be introduced into the at least one convergence channel 5112 and is guided to the central cavity 5111. In this embodiment, the at least one inlet 5110, the at least one convergence channel 5112 and the central cavity 5111 of the gas inlet plate 511 are integrally formed. The central cavity 5111 is a convergence chamber for temporarily storing the air.

Preferably but not exclusively, the gas inlet plate 511 is made of stainless steel. In some embodiments, the depth of the convergence chamber defined by the central cavity 5111 is equal to the depth of the at least one convergence channel 5112. The resonance plate 512 is made of flexible material, which is preferably but not exclusively copper. The resonance plate 512 further comprises a central aperture 5120 corresponding to the central cavity 5111 of the gas inlet plate 511 that providing the gas for flowing through. Hereinafter, the region of the resonance plate 512 corresponding to the central cavity 5111 of the gas inlet plate 511 is also referred as a movable part 5121 of the resonance plate 512. The region of the resonance plate 512 attached on the gas inlet plate 511 is also referred as a fixed part 5122.

Figure 8A:
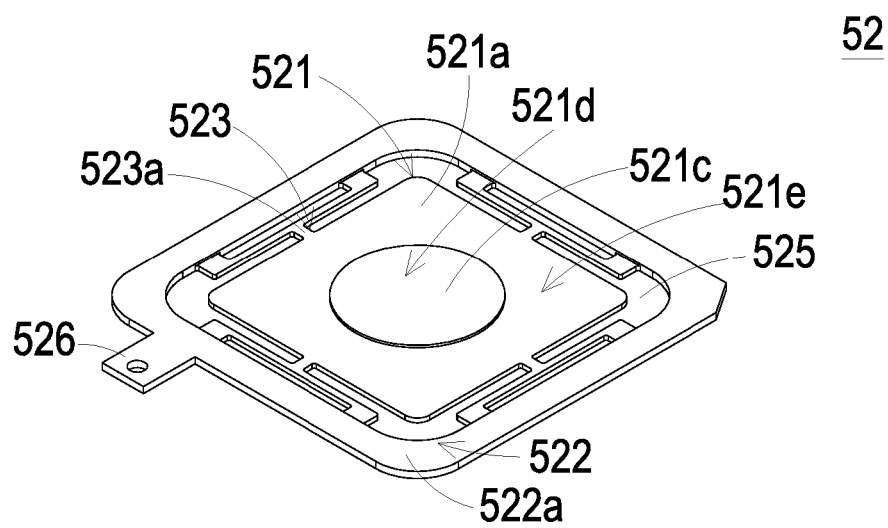
FIG. 8A is a schematic perspective view illustrating the piezoelectric actuator of the gas transportation device of the present invention and taken along the front side.
Figure 8B:
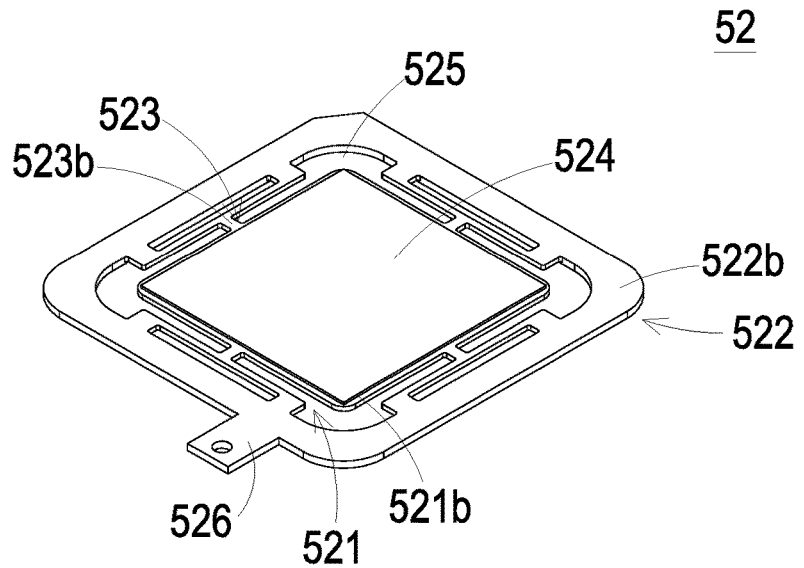
FIG. 8B is a schematic perspective view illustrating the piezoelectric actuator of the gas transportation device of the present invention and taken along the rear side.
Figure 8C:
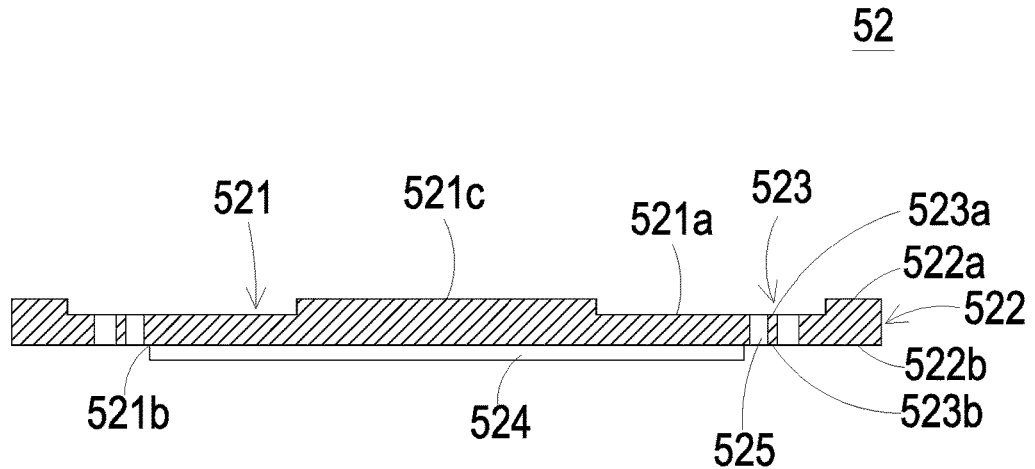
FIG. 8C is a schematic cross-sectional view illustrating the piezoelectric actuator of the gas transportation device of the present invention.

FIG. 8A is a schematic perspective view illustrating the piezoelectric actuator of the gas transportation device of the present invention and taken along the front side. FIG. 8B is a schematic perspective view illustrating the piezoelectric actuator of the gas transportation device of the present invention and taken along the rear side. FIG. 8C is a schematic cross-sectional view illustrating the piezoelectric actuator of the gas transportation device of the present invention. As shown in FIGS. 8A, 8B and 8C, the piezoelectric actuator 52 comprises the suspension plate 521, the outer frame 522, the at least one bracket 523, and the piezoelectric plate 524. The length of a side of the piezoelectric plate 524 is equal to or less than the length of a side of the suspension plate 521. The piezoelectric plate 524 is attached on a first surface 521b of the suspension plate 521. In response to an applied voltage, the piezoelectric plate 524 would be subjected to a curvy vibration. The suspension plate 521 comprises a middle portion 521d and a periphery portion 521e. When the piezoelectric plate 524 is subjected to the curvy vibration, the suspension plate 521 is subjected to the curvy vibration from the middle portion 521d to the periphery portion 521e. The at least one bracket 523 is arranged between the suspension plate 521 and the outer frame 522. That is, the at least one bracket 523 is connected between the suspension plate 521 and the outer frame 522, while the two ends of the bracket 523 are connected with the outer frame 522 and the suspension plate 521 respectively that the bracket 523 can elastically support the suspension plate 521. Moreover, at least one vacant space 525 is formed between the bracket 523, the suspension plate 521 and the outer frame 522 for allowing the gas to go through. The type of the suspension plate 521 and the outer frame 522 and the type and the number of the at least one bracket 523 may be varied according to the practical requirements. Moreover, a conducting pin 526 is protruded outwardly from the outer frame 522 so as to be electrically connected with an external circuit (not shown).

In this embodiment, the suspension plate 521 has a bulge 521c that makes the suspension plate 521 a stepped structure. The bulge 521c is formed on a second surface 521a of the suspension plate 521. For example, the bulge 521c may be a circular convex structure. A top surface of the bulge 521c of the suspension plate 521 is coplanar with a second surface 522a of the outer frame 522, and the second surface 521a of the suspension plate 521 is coplanar with a second surface 523a of the bracket 523. Moreover, there is a drop of specified amount from the bulge 521c of the suspension plate 521 (or the second surface 522a of the outer frame 522) to the second surface 521a of the suspension plate 521 (or the second surface 523a of the bracket 523). A first surface 521b of the suspension plate 521, a first surface 522b of the outer frame 522 and a first surface 523b of the bracket 523 are coplanar with each other. The length of the piezoelectric plate 524 is equal to or less than the length of the suspension plate 521. The piezoelectric plate 524 is attached on the first surface 521b of the suspension plate 521. In some other embodiments, the suspension plate 521 may be a square plate structure with two flat surfaces but the type of the suspension plate 521 may be varied according to the practical requirements. In this embodiment, the suspension plate 521, the at least bracket 523 and the outer frame 522 are integrally formed and produced by using a metal plate (e.g., a stainless steel plate).

In the gas transportation device 50, the first insulation plate 531, the conducting plate 54 and the second insulation plate 532 are stacked on each other sequentially and located under the piezoelectric actuator 52. The profiles of the first insulation plate 531, the conducting plate 54 and the second insulation plate 532 substantially match the profile of the outer frame 522 of the piezoelectric actuator 52. The first insulation plate 531 and the second insulation plate 532 are made of an insulating material (e.g. a plastic material) for providing insulating efficacy. The conducting plate 54 is made of an electrically conductive material (e.g. a metallic material) for providing electrically conducting efficacy. Moreover, the conducting plate 54 has a conducting pin 541 so as to be electrically connected with an external circuit (not shown).

Figure 9A:
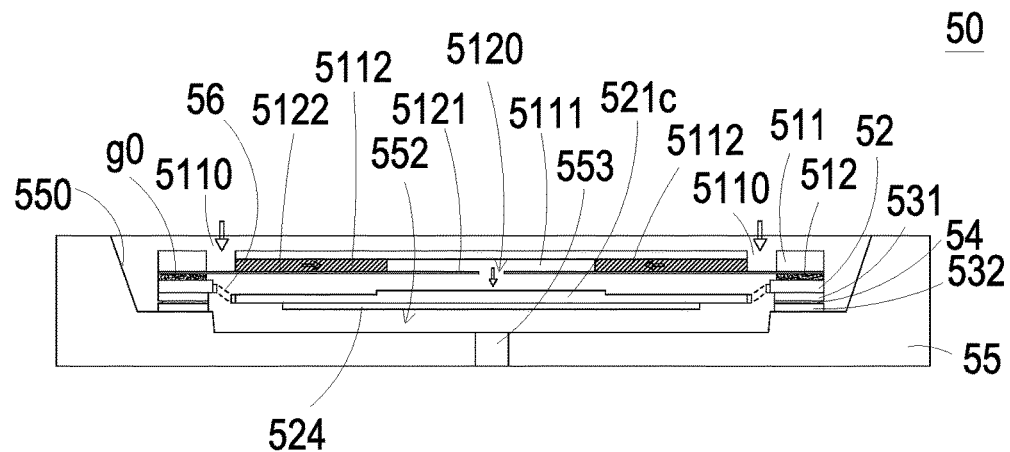
FIGS. 9A to 9C schematically illustrate the actions of the gas transportation device of the portable electronic device according to the embodiment of the present invention.
Figure 9B:
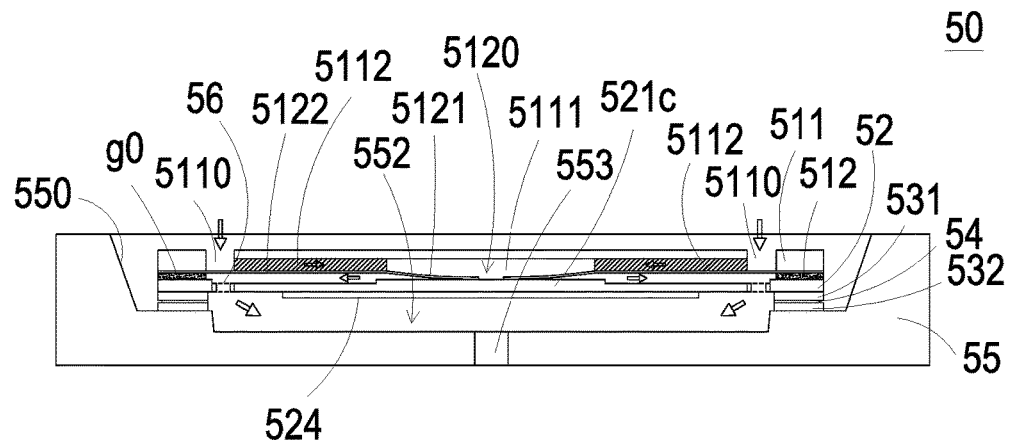
Figure 9C:
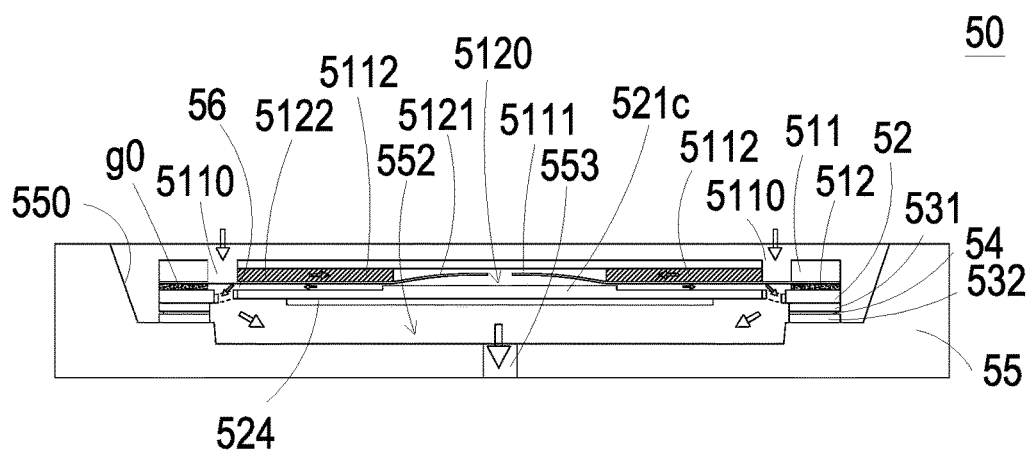

FIGS. 9A to 9C schematically illustrate the actions of the gas transportation device of the portable electronic device according to the embodiment of the present invention. As shown in FIG. 9A, the second insulation plate 532, the conducting plate 54, the first insulation plate 531, the piezoelectric actuator 52, the resonance plate 512 and the gas inlet plate 511 of the gas transportation device 50 are stacked on each other sequentially. Moreover, there is a gap g0 between the resonance plate 512 and the outer frame 522 of the piezoelectric actuator 52. In this embodiment, a filler (e.g. a conductive adhesive) is inserted into the gap g0. Consequently, the depth of the gap g0 between the resonance plate 512 and the bulge 521c of the suspension plate 521 can be maintained to guide the gas to flow more quickly. Moreover, due to the proper distance between the resonance plate 512 and the bulge 521c of the suspension plate 521, the contact interference is reduced and the generated noise is largely reduced. In some embodiments, the height of the outer frame 522 of the piezoelectric actuator 52 is increased, so that the gap is formed between the resonance plate 512 and the piezoelectric actuator 52.

Please refer to FIG. 5A, FIG. 6A and FIGS. 9A to 9C. The gas collecting plate 55 comprises a recess 550, a fiducial surface 551, a gas-collecting chamber 552 and a perforation 553. The recess 550 has a depth. Consequently, the second insulation plate 532, the conducting plate 54, the first insulation plate 531, the piezoelectric actuator 52, the resonance plate 512 and the gas inlet plate 511 are stacked on each other sequentially and accommodated within the recess 550. The gas-collecting chamber 552 is concavely formed on a bottom surface of the recess 550. The gas-collecting chamber 552 is in communication with the perforation 553. Since the piezoelectric actuator 52 is located over the gas-collecting chamber 552 and sealing the gas-collecting chamber 552 from top, the gas transferred by the gas transportation device 50 is temporarily accumulated in the gas-collecting chamber 552 and discharged from the gas collecting plate 55. Moreover, a window 554 is formed in a lateral side of the gas collecting plate 55. The window 554 is in communication with the recess 550. After the second insulation plate 532, the conducting plate 54, the first insulation plate 531, the piezoelectric actuator 52, the resonance plate 512 and the gas inlet plate 511 are stacked on each other sequentially and accommodated within the recess 550 of the gas collecting plate 55 to seal the gas-collecting chamber 552, the conducting pin 541 of the conducting plate 54 and the conducting pin 526 of the piezoelectric actuator 52 are protruded out of the window 554 of the gas collecting plate 55. Consequently, the conducting pins 541 and 526 can be electrically connected with an external circuit (not shown).

Please refer to FIGS. 9A to 9C again. After the second insulation plate 532, the conducting plate 54, the first insulation plate 531, the piezoelectric actuator 52, the resonance plate 512 and the gas inlet plate 511 are stacked on each other sequentially and accommodated within the recess 550 of the gas collecting plate 55 to seal the gas-collecting chamber 552, a convergence chamber for converging the gas is defined by the central aperture 5120 of the resonance plate 512 and the gas inlet plate 511 collaboratively. In addition, a temporary storage chamber 56 is formed between the resonance plate 512 and the piezoelectric actuator 52 for temporarily storing the gas. Through the central aperture 5120 of the resonance plate 512, the temporary storage chamber 56 is in communication with the central cavity 5111 that is formed in the first surface 511b of the gas inlet plate 511. The peripheral regions of the temporary storage chamber 56 are in communication with the underlying gas-collecting chamber 552 through the vacant space 525 of the piezoelectric actuator 52.

Please refer to FIG. 9A. When the gas transportation device 50 is enabled, the piezoelectric actuator 52 is actuated in response to an applied voltage. Consequently, the piezoelectric actuator 52 vibrates along a vertical direction in a reciprocating manner, while the brackets 523 are served as the fulcrums. Since the resonance plate 512 is light and thin, the resonance plate 512 vibrates along the vertical direction in the reciprocating manner because of the resonance of the piezoelectric actuator 52. In other words, the movable part 5121 of the resonance plate 512 corresponding to the central cavity 5111 of the gas inlet plate 511 is reciprocated and subjected to a curvy deformation.

Please refer to FIG. 9B. After the gas is fed into the at least one inlet 5110 of the gas inlet plate 511, the gas is transferred to the central cavity 5111 of the gas inlet plate 511 through the at least one convergence channel 5112. Then, the gas is transferred through the central aperture 5120 of the resonance plate 512, and introduced downwardly into the temporary storage chamber 56. When the piezoelectric actuator 52 vibrates downwardly, the movable part 5121 of the resonance plate 512 is subjected to the curvy deformation because the movable part 5121 of the resonance plate 512 is pushed by the gas and vibrated in response to the piezoelectric actuator 52. Consequently, the movable part 5121 of the resonance plate 512 vibrates downwardly and is in contact with the bulge 521c of the suspension plate 521 of the piezoelectric actuator 52. Meanwhile, the gap between the suspension plate 521 and the fixed part 5122 of the resonance plate 512 is not reduced. Due to the deformation of the resonance plate 512, the volume of the temporary storage chamber 56 is shrunken and a middle communication space of the temporary storage chamber 56 is closed. Under this circumstance, the gas is pushed toward peripheral regions of the temporary storage chamber 56. Consequently, the gas is transferred downwardly through the vacant space 525 of the piezoelectric actuator 52.

Please refer to FIG. 9C. Then, the piezoelectric actuator 52 vibrates upwardly in response to the applied voltage. The movable part 5121 of the resonance plate 512 is subjected to the curvy deformation. Consequently, the volume of the temporary storage chamber 56 is also shrunken. Since the piezoelectric actuator 52 is ascended, the gas is continuously pushed toward peripheral regions of the temporary storage chamber 56. Meanwhile, the gas is continuously fed into the at least one inlet 5110 of the gas inlet plate 511, and transferred to and temporarily stored in the central cavity 5111. Moreover, the gas in the temporary storage chamber 56 is transferred downwardly to the gas-collecting chamber 552 through the vacant space 525 of the piezoelectric actuator 52, and finally the gas is discharged from the gas collecting plate 55 through the perforation 553.

Then, the piezoelectric actuator 52 is vibrated downwardly. Consequently, the movable part 5121 of the resonance plate 512 is returned to the original position as shown in FIG. 9A. Under this circumstance, the gas in the central cavity 5111 is transferred to the temporary storage chamber 56 through the central aperture 5120 of the resonance plate 512.

The steps of the FIGS. 9A to 9C are repeatedly done. Consequently, the action of transferring the gas by the gas transportation device 50 is achieved.

Figure 10:
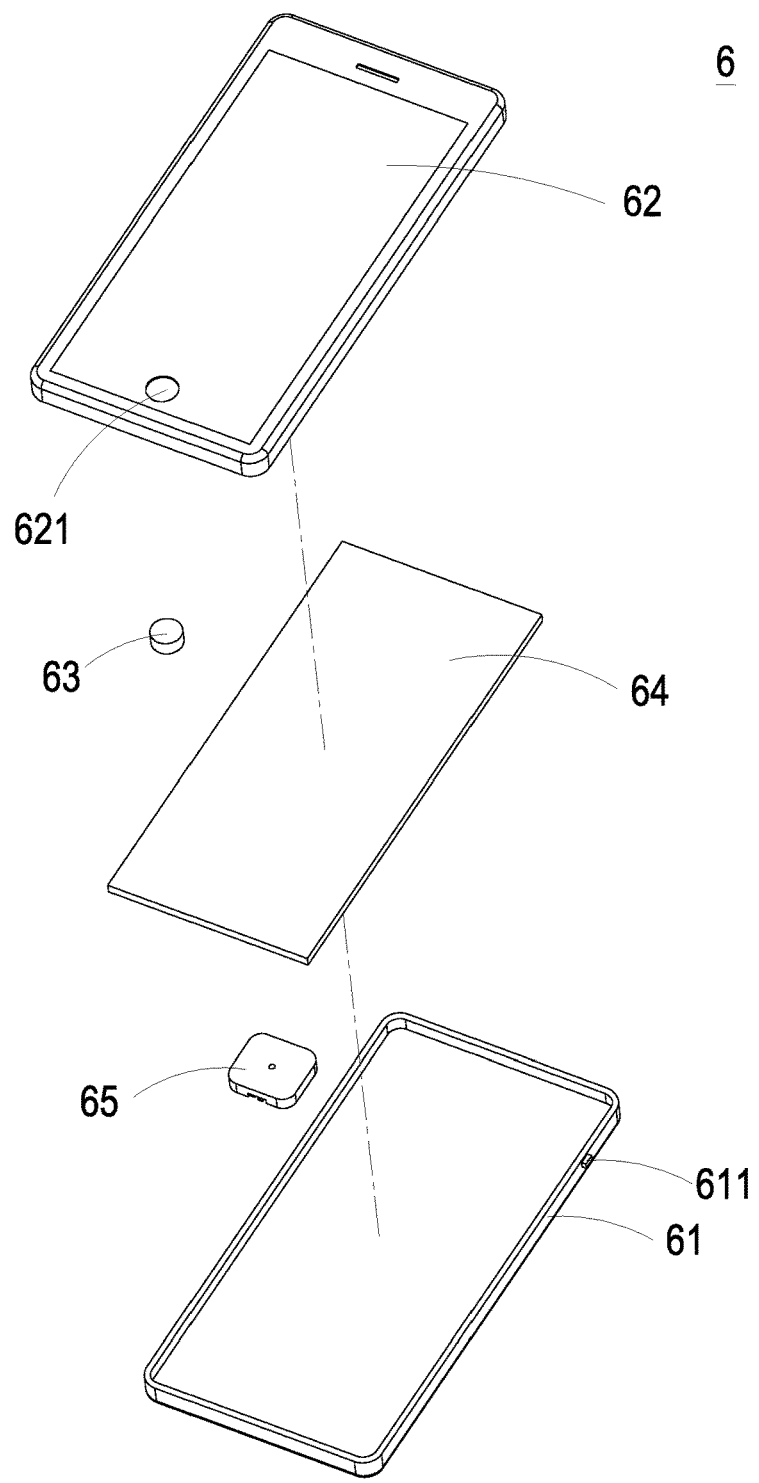
FIG. 10 is a schematic exploded view illustrating the appearance of a portable electronic device according to a second embodiment of the present invention.

FIG. 10 is a schematic exploded view illustrating the appearance of a portable electronic device according to a second embodiment of the present invention. As shown in FIG. 10, the portable electronic device 6 comprises a casing 61, a display panel 62, a cushion 63, an inflatable pad 64 and a gas transportation device 65. The display panel 62 is coupled with the casing 61. Moreover, the display panel 62 comprises a pliable display region 621 that is vertically movable. The cushion 63 is attached on a bottom surface of the pliable display region 621. The inflatable pad 64 is attached on a bottom surface of the display panel 62 and covering the cushion 63. The gas transportation device 65 is disposed within the casing 10. Moreover, the gas transportation device 65 is in communication with the inflatable pad 63 through a communication pipe (not shown). For supporting the display panel 62, the gas transportation device 65 transfers gas to the inflatable pad 63 so that the inflatable pad 63 is inflated and provides a supporting force to the display panel 62. The portable electronic device 6 further comprises a sensing unit (not shown). When the sensing unit senses a touch, the sensing unit issues a first driving signal to the gas transportation device 65. In response to the first driving signal, the gas transportation device 65 transfers more gas to the inflatable pad 63 to expand the inflatable pad 63 and make the inflatable pad 63 raise the cushion 63. The raised cushion 63 raises the pliable display region 621 to be convex, thus imitating a physical key to be pressed.

In comparison with the first embodiment, the display panel 62 of this embodiment is distinguished, while the other components of this embodiment are similar to those of the first embodiment and are not redundantly described herein. Similarly, at least one key 611 is embedded in at least one lateral side of the portable electronic device 6, in which a gas bag (not shown) is located under the key 611. The gas bag is in communication with the gas transportation device 65 through an additional communication pipe. When the gas bag is inflated by the gas transportation device 65 and expanded, the at least one key 611 is raised.

From the above descriptions, the present invention provides the portable electronic device comprising the cushion attached on the movable region of the flexible display panel or the pliable display region of the display panel. After the inflatable pad is inflated with a gas through the gas transportation device, the cushion is pushed upwardly by the expanded inflatable pad and raises the movable region of the flexible display panel or the pliable display region of the display panel, which forms a convex key for user to press, providing a tactile feeling similar to the conventional physical key. Since the portable electronic device of the present invention is not equipped with the physical key, the fabricating cost and the weight of the portable electronic device are reduced and the use life is prolonged. An additional advantage of the present invention is that the display range can extend to the bottom portion of the front surface of the smart phone because the movable region/pliable display region plays both the roles as the key and a part of the display.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable electronic device, comprising:
    a casing;
    a flexible display panel coupled with the casing and comprising a movable region;
    a cushion attached on the movable region of the flexible display panel;
    an inflatable pad attached on a bottom surface of the flexible display panel and covering the cushion;
    a gas transportation device disposed within the casing and in communication with the inflatable pad to transfer gas to the inflatable pad so that the inflatable pad is inflated and supporting the flexible display panel; and
    a sensing unit electrically connected with the gas transportation device, wherein when an external contact force is sensed by the sensing unit, the sensing unit transmits a first driving signal to the gas transportation device, wherein in response to the first driving signal, the gas transportation device transfers gas to the inflatable pad to expand the inflatable pad and make the inflatable pad raise the cushion, so that the movable region of the flexible display panel corresponding to the cushion is raised.

2. The portable electronic device according to claim 1, wherein the flexible display panel comprises a sensing layer and a displaying layer, wherein the displaying layer is located over the sensing layer.

3. The portable electronic device according to claim 2, wherein the flexible display panel further comprises a covering layer located over the displaying layer.

4. The portable electronic device according to claim 1, wherein a key is embedded in a lateral side of the portable electronic device, and a gas bag is located under the key and in communication with the gas transportation device, wherein when the external contact force is sensed by the sensing unit, a second driving signal is transmitted from the sensing unit to the gas transportation device, wherein in response to the second driving signal, the gas transportation device transfers gas to the gas bag to expand the gas bag, so that the key is raised by the gas bag.

5. The portable electronic device according to claim 4, wherein the portable electronic device further comprises at least one communication pipe, wherein the at least one communication pipe is in communication between the gas transportation device and the inflatable pad or in communication between the gas transportation device and the gas bag.

6. The portable electronic device according to claim 1, wherein the gas transportation device comprises:
    a gas inlet plate;
    a resonance plate having a central aperture;
    a piezoelectric actuator; and
    a gas collecting plate comprising a recess, a fiducial surface and a perforation, wherein the piezoelectric actuator, the resonance plate and the gas inlet plate are stacked on each other sequentially and accommodated within the recess, wherein a gas-collecting chamber is concavely formed on a bottom surface of the recess, the gas-collecting chamber is in communication with the perforation, and the piezoelectric actuator is located over the gas-collecting chamber to seal the gas-collecting chamber,
    wherein a temporary storage chamber is formed between the resonance plate and the piezoelectric actuator, wherein when the piezoelectric actuator is actuated, the gas is sequentially fed into the gas inlet plate, transferred through the resonance plate, introduced into the temporary storage chamber, transferred to the gas-collecting chamber, and discharged from the gas collecting plate through the perforation, so that the gas is continuously transferred by the gas transportation device.

7. A portable electronic device, comprising:
    a casing;
    a display panel coupled with the casing and comprising a pliable display region;

a cushion attached on the pliable display region of the display panel;

an inflatable pad attached on a bottom surface of the display panel and covering the cushion;

a gas transportation device disposed within the casing and in communication with the inflatable pad to transfer gas to the inflatable pad so that the inflatable pad is inflated and supporting the display panel; and a sensing unit electrically connected with the gas transportation device, wherein when an external contact force is sensed by the sensing unit, the sensing element transmits a first driving signal to the gas transportation device, wherein in response to the first driving signal, the gas transportation device transfers gas to the inflatable pad to expand the inflatable pad and make the inflatable pad raise the cushion, so that the pliable display region of the display panel corresponding to the cushion is raised.

8. The portable electronic device according to claim 7, wherein the display panel comprises a sensing layer and a displaying layer, wherein the displaying layer is located over the sensing layer.

9. The portable electronic device according to claim 8, wherein the display panel further comprises a covering layer located over the displaying layer.

10. The portable electronic device according to claim 7, wherein a key is embedded in a lateral side of the portable electronic device, and a gas bag is located under the key and in communication with the gas transportation device, wherein when the external contact force is sensed by the sensing unit, a second driving signal is transmitted from the sensing unit to the gas transportation device, wherein in response to the second driving signal, the gas transportation device transfers gas to the gas bag to expand the gas bag, so that the key is raised by the gas bag.

11. The portable electronic device according to claim 7, wherein the gas transportation device comprises:

a gas inlet plate;

a resonance plate having a central aperture;

a piezoelectric actuator; and a gas collecting plate comprising a recess, a fiducial surface and a perforation, wherein the piezoelectric actuator, the resonance plate and the gas inlet plate are stacked on each other sequentially and accommodated within the recess, wherein a gas-collecting chamber is concavely formed on a bottom surface of the recess, the gas-collecting chamber is in communication with the perforation, and the piezoelectric actuator is located over the gas-collecting chamber to seal the gas-collecting chamber, wherein a temporary storage chamber is formed between the resonance plate and the piezoelectric actuator, wherein when the piezoelectric actuator is actuated, the gas is sequentially fed into the gas inlet plate, transferred through the resonance plate, introduced into the temporary storage chamber, transferred to the gas-collecting chamber, and discharged from the gas collecting plate through the perforation, so that the gas is continuously transferred by the gas transportation device.

\* \* \* \* \*